June 10, 1969     F. L. SAUNDERS ET AL     3,449,270

METHOD OF MAKING FOAMED CRYSTALLINE VINYL AROMATIC POLYMER

Filed May 28, 1968

INVENTORS.
Frank L. Saunders
BY James H. Oswald

Griswold & Burdick
ATTORNEYS

United States Patent Office 3,449,270
Patented June 10, 1969

3,449,270
METHOD OF MAKING FOAMED CRYSTALLINE VINYL AROMATIC POLYMER
Frank L. Saunders, Midland, and James H. Oswald, Bay City, Mich., assignors to The Dow Chemical Company, Midland, Mich., a corporation of Delaware
Continuation-in-part of application Ser. No. 285,916, June 6, 1963. This application May 28, 1968, Ser. No. 732,638
Int. Cl. C08f $47/10$, $7/02$
U.S. Cl. 260—2.5        3 Claims

ABSTRACT OF THE DISCLOSURE

The invention concerns crystalline foam of isotactic vinyl aromatic polymer and pertains to a method of making the same which comprises impregnating the amorphous form of the isotactic polymer with a blowing agent and foaming it at a temperature below its crystalline melting point.

---

Figure 1:
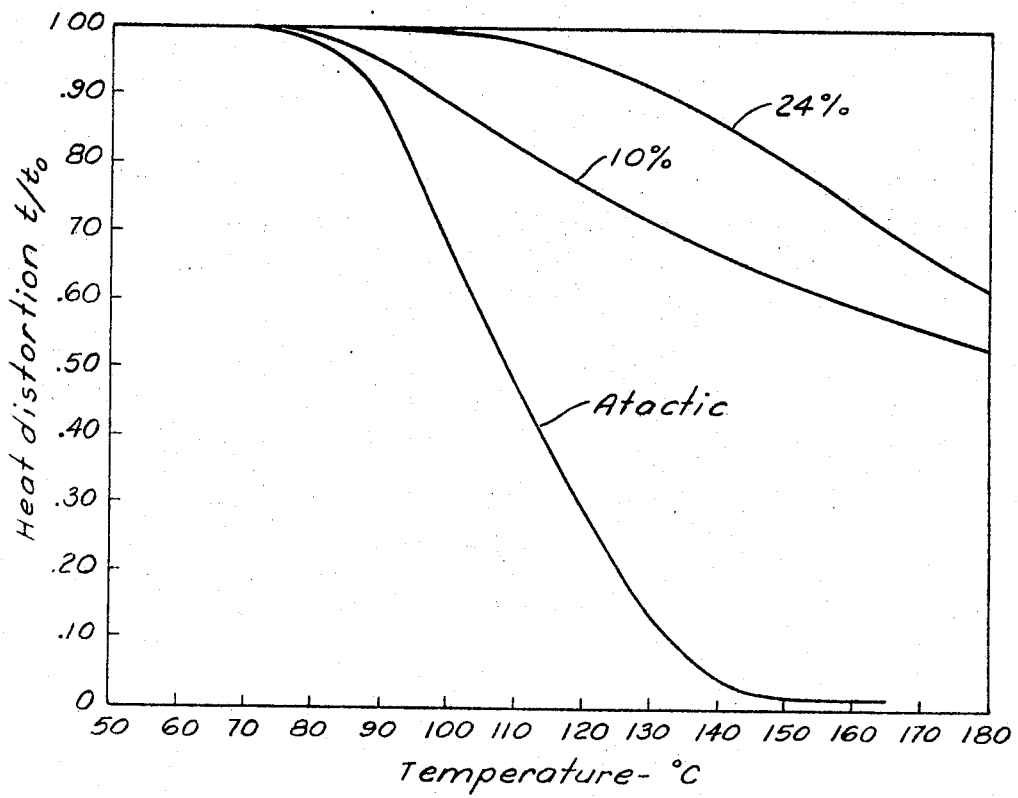

This application is a continuation-in-part of our prior application Ser. No. 285,916 filed June 6, 1963, now abandoned.

This invention relates to crystalline foams of vinyl aromatic polymer and a method of preparation. The invention is directed to a crystalline foam having a high heat distortion temperature and good solvent resistance which is prepared easily from an amorphous isotactic polymer having more favorable working properties than the crystalline polymer.

The common atactic vinyl aromatic polymers such as polystyrene produce light-weight foams having good thermal insulating properties. Although these foams have found wide applications on the basis of these properties, their utility has been limited by the low heat distortion temperature and poor solvent resistance of these polymers. The heat distortion temperatures of amorphous polystyrene, for example, is below 100° C., therefore it cannot be used where it will be exposed to temperatures near that of boiling water. Also, owing to the poor solvent resistance of the polymer the foam cannot be used where it might contact paints or adhesives containing any of many common organic solvents. The rapid distortion of the foam structure and coalescence of the polymer at temperatures above the heat distortion temperature and by organic solvents make these foams unsuitable for many applications.

Isotactic polymers of vinyl compounds and particularly those of the alkenyl aromatics such as styrene have been prepared using a Ziegler type catalyst as described in British Patent 866,760. These polymers have greatly improved resistance to common solvents and their heat distortion temperatures are approximately 50° C. higher than those of the corresponding atactic polymers. These properties, while providing a more durable product, render the polymer exceedingly difficult to foam. For one thing, incorporation of the blowing agent is much more difficult. Another problem is that polymer decomposition may occur to some extent at the high temperature necessary to soften the polymer sufficiently to produce the foam. It is therefore an object of our invention to produce a crystalline, foamed polymer having these superior properties without the attendant problems of working with a crystalline polymer.

We have found that a foamed polymer having substantial crystallinity may be prepared with approximately equal facility as the atactic polymer by first reducing the isotactic polymer completely to the amorphous form then incorporating a blowing agent and foaming at a reduced temperature. The molecular orientation which develops in the polymer as it is foamed produces sufficient crystallization of the polymer to increase the heat distortion temperature of the foam substantially. Higher crystallinity of the foamed polymer may be obtained by annealing the foam at a temperature above the heat distortion temperature of the amorphous polymer, but below the crystalline melting point of the polymer.

The invention can be described by referring to an experiment where a quantity of crystalline foam was prepared. The isotactic polystyrene used in the experiment was obtained by the stereospecific polymerization of styrene monomer using an aluminum triethyl—$TiCl_3$ catalyst system with hexane as a diluent. The polymer was compression molded into sheets at 300° C. then was quenched in water at 25° C. to prevent the development of crystalline structures and obtain the amorphous form of the isotactic polymer. The sheet was then ground in a mill to obtain small chips of the amorphous polymer. Two grams of these chips and 5 cc. of normal pentane were placed in a mold having a cavity two inches in diameter and ⅞ inch deep. The mold was then closed and sealed in a press at 170° C. After three minutes the pressure inside the mold was reduced so that the polymer could expand and fill the mold. The foam produced in this manner had a density of about 3 pounds per cubic foot and a relative crystallinity as determined by X-ray of about 10 percent. This foam had excellent resistance to organic solvents such as acetone, methyl ethyl ketone, etc. which are good solvents for common atactic polystyrene. The improved heat distortion property was evidenced by the fact that the foam did not collapse in the mold at a temperature of approximately 170° C. The foam sample was later annealed at 165° C. for one hour to increase the crystallinity which was determined to be about 24 percent following the annealing step. Samples of the foam were extracted with benzene in a Soxhlet extractor for 24 hours to determine solvent resistance. The foam having 10 percent crystallinity was 83 percent insoluble and that having 24 percent crystallinity was 92 percent insoluble whereas amorphous atactic polystyrene is completely soluble.

The curves of FIGURE 1 illustrate the improved heat distortion properties of isotactic polystyrene having different degrees of crystallinity compared with that of atactic polystyrene. These heat distortion values were obtained by placing a sample of the foam ½ inch square under a 632 gram weight in a glycol bath and measuring the thickness of the sample as the temperature of the bath was increased at a rate of about 2° per minute. The values plotted are the ratio of the thickness, $t$, at the bath temperature to the initial thickness, $t_o$. This figure illustrates the great effect on heat distortion produced by a minor amount of crystallinity in the polymer. Polystyrene having as little as 5 percent crystallinity exhibits substantial improvement in heat distortion.

An isotactic copolymer containing 81 percent ortho vinyl toluene and 19 percent styrene prepared by the copolymerization of the monomers with $TiCl_3$ and aluminum triethyl in hexane was molded in a compression mold at 300° C. for 5 minutes then quenched in water. A sample of this copolymer and pentane, a blowing agent, were placed in a mold and heated for 5 minutes at 180° C. then expanded. The resulting foam had a relative crystallinity of 16 percent and was resistant to attack by acetone and other common resin solvents.

In view of the crystallinity produced during polymerization of the monomers it is necessary to melt the polymer to destroy the crystallinity then quench the molten polymer to retain the amorphous structure which is required to produce the foam, otherwise the polymer will not melt below its crystalline melting point of about 235° C., in the case of polystyrene. Permeation of the blowing agent into the softened polymer is limited by the crystalline phase. Also, it is desirable to communicate the quenched polymer to facilitate the incorporation of the blowing agent. Any of the blowing agents commonly used to produce foams of the corresponding atactic polymers may be used. These agents should not be reactive with the polymer. Additionally, the boiling point of the agent must be below the softening point of the polymer. Low molecular weight hydrocarbons such as pentane and hexane are commonly used in foaming polystyrene and other alkenyl aromatic polymers.

Foamed crystalline polymer may be produced in accordance with this invention within a mold as described above or by an extrusion process wherein the polymer containing a blowing agent is heated under pressure to the blowing temperature then extruded into a low pressure zone whereby sheets or boards of the crystalline foam are produced. The temperature range for blowing isotactic amorphous polystyrene is from about 125 to about 200° C. and preferably about 150 to 175° C. Blowing at temperatures below this range does not produce sufficient crystallinity whereby a practical annealing temperature can be used to develop a desirable ultimate crystallinity within a reasonable length of time. Blowing at temperatures above this range may result in destruction of the foam before it is removed from the mold. The polymer should not be held at the blowing temperature for more than about 30 minutes prior to the release of pressure and expansion of the blowing agent to avoid the development of crystalline structures which will interfere with the satisfactory development of the foam structure. The minimum length of time the polymer may be held at the blowing temperature is dependent upon the rate at which the blowing agent permeates the polymer. This rate is obviously influenced to a large extent by the configuration of the polymer particles, with irregular shapes and small diameters favoring rapid permeation.

The foam may be annealed either in the mold or in a separate annealing oven. The rate of crystal growth in the polymer generally increases with temperature, therefore it usually is desirable to carry out the operation at as high a temperature as possible to minimize the length of time required. Crystallization proceeds at a practical rate at the blowing temperature where the polymer is soft yet has sufficient strength to prevent foam collapse. Annealing should be conducted at temperatures approximately 25–50° C. below the crystalline melting point of the polymer to prevent collapse of the foam structure and coalescence of the polymer. The precise temperature range suitable for annealing a particular foamed polymer will depend upon the melting point of the polymer.

In addition to polystyrene any of the alkenyl aromatic polymers known to produce crystalline polymers such as vinyl toluene, vinyl xylene, $\alpha$-methyl styrene, chlorostyrene or copolymers thereof may be used in practicing our invention.

We claim:

1. A method of producing a crystalline foam of an isotactic vinyl aromatic polymer which comprises permeating a comminuted amorphous isotactic vinyl aromatic polymer with a blowing agent at a temperature below the crystalline melting point of the polymer and under sufficient pressure to prevent vaporization of the agent, then reducing the pressure on said permeated polymer to a level whereby said blowing agent vaporizes and foams said polymer, the crystallization of said polymer being at least 5 percent and a density not exceeding 3 pounds per cubic foot indused by said foaming at said temperature range.

2. A method according to claim 1 wherein the crystallinity of said foam is increased by annealing said foam at a temperature between said blowing temperature and the crystalline melting point of said polymer.

3. A method of producing a crystalline foam of an isotactic polymer of an alkenyl aromatic compound which comprises incorporating a blowing agent in an amorphous isotactic polymer of said alkenyl aromatic compound then decreasing the pressure and expanding said polymer into a foam at a temperature below the crystalline melting point of the polymer.

References Cited

UNITED STATES PATENTS 2,983,692  5/1961  D'Alelio.
3,138,478  6/1964  Hedman et al.

SAMUEL H. BLECH, *Primary Examiner.*

M. FOELAK, *Assistant Examiner.*

U.S. Cl. X.R.
260—32.8, 93.5